3,422,123
PROCESS FOR PREPARING 16α-ALKYL-17-BROMOPREGNANES
Hans Reimann, Wayne, and Emanuel B. Hershberg, West Orange, N.J., assignors to Schering Corporation, Bloomfield, N.J., a corporation of New Jersey
No Drawing. Filed Jan. 18, 1966, Ser. No. 521,429
U.S. Cl. 260—397.4                                    7 Claims
Int. Cl. C07c *169/34*

ABSTRACT OF THE DISCLOSURE

Described is an improved, one-vessel process for the conversion of a 16-dihydro-20-keto-pregnane to a 16α-alkyl-17α-bromo-20-keto-pregnane (known compounds valuable as intermediates) which comprises adding an approximately equimolar quantity of an alkyl magnesium halide to a 16-dehydro-20-keto-pregnane, then adding bromine to the thereby formed 16α-lower alkyl-20-magnesium halide enolate in situ in a ratio of about one mole bromine per mole of said 16-dehydro-20-keto-pregnane.

By this process one can prepare 16α-alkyl-17α-bromo-20-keto-pregnanes of high purity in excellent yields from a 16-dehydro-20-keto-pregnane in one operation without having to isolate the 20-enolate intermediate or having to reform protective groups prior to bromination, and advantageously, with bromination occurring only at C-17 even with other unsaturations present in the molecule.

---

This invention relates to a novel, improved process for preparing 16α-alkyl-17-bromo-pregnanes, and to novel compounds produced thereby.

The invention sought to be patented is described as residing in the concept of an improved, one-vessel process for the preparation of a 16α-alkyl-17-bromo-20-keto-pregnane from a 16-dehydro-20-keto-pregnane by the preparation of a 16α-alkyl-20-magnesium halide enolate of said 16-dehydro-20-keto-pregnane, and bromination of said 16α-alkyl-20-magnesium halide enolate in situ without isolation or purification thereof.

In brief, the concept of the improved process of this invention is represented by the following flow diagram 1:

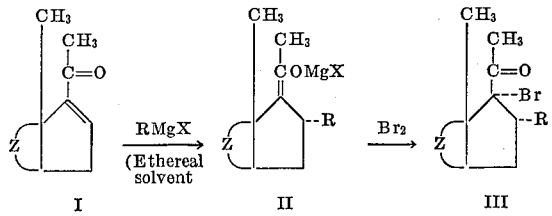

wherein Z represents the A, B, and C rings of a steroid selected from the group consisting of 5α-16-pregnen-3β-ol-20-one, the 5 dehydro- and the 9(11)-dehydro analogs thereof, and their 3-lower alkanoate esters; X represents a halogen, preferably chlorine and bromine; and R represents lower alkyl, i.e., hydrocarbon radicals having preferably up to 4 carbon atoms, including methyl, ethyl, n-propyl, isopropyl, n-butyl, sec-butyl, and tertiary butyl.

Ethereal solvents used in our process include dialkyl ethers, e.g., diethyl ether, cyclic ethers, e.g., tetrahydrofuran, and solvent mixtures comprising an ether together with an inert solvent such as toluene, benzene, and the like. Usually, tetrahydrofuran is the solvent of choice.

Specifically, the invention sought to be patented, is described as residing in the concept of an improved process in which a lower alkyl magnesium halide (RMgX) is added to a 16-dehydro-20-keto-pregnane having a hydrogen at C-16, I (e.g., 16-dehydropregnenolone 3-acetate), said alkyl magnesium halide added being substantially equimolar to said 16-dehydro-20-keto-pregnane; followed by the addition of bromine to the thereby formed 16α-lower alkyl-20-magnesium halide enolate, II(e.g., 3β-acetoxy-16α-methyl-5,17(20)-pregnadien-20-ol 20-magnesium bromide salt) in situ in said ethereal solvent, the quantity of bromine added being substantially equimolar to that of said starting 16-dehydro-20-keto-pregnane; whereby is formed a 16α-lower alkyl-17-bromo-20-keto-pregnane, III, e.g., 16α-methyl-17α-bromopregnenolone acetate.

The 16α-lower alkyl-17α-bromo-2-keto-pregnanes (and, in particular, 16α-methyl-17α-bromopregnenolone acetate) produced by our proces are known in the art as valuable intermediates in the preparation of the corresponding 16-lower alkyl-16-dehydropregnanes (e.g., 16-methyl-16-dehydropregnenolone acetate) which, in turn, are known, valuable intermediates in the preparation of therapeutically valuable compounds. Thus, for example, 16α-methyl-17α-bromopregnenolone acetate (prepared as described above) upon treatment with lithium bromide and lithium carbonate according to known procedures will yield 16-methyl-16-dehydropregnenolone and its corresponding acetate are well known compounds in the steroid literature, having known utility as intermediates in the preparation of 16β-methylated progestational agents, 16-methylated corticoids, etc. For example, 16-methyl-16-dehydropregnenolone may be selectively hydrogenated catalytically to provide 16β-methylpregnenolone which may be oxidized to 16β-methylprogesterone. Alternatively, 16-methyl-16-dehydropregnenolone acetate may be catalytically hydrogenated to 16β-methyl-5α-pregnanolone acetate, a key intermediate in the synthesis of 11,21-oxygenated-16β-methyl-17α-hydroxy-1,4-pregnadienes, which are known, valuable corticoids. Additionally, by way of example, 16-methyl-16-dehydropregnenolone may also be epoxidized by well-known procedures to the valuable 16β-methyl-16α,17α-oxido-pregnenolone, a known, important precursor in the preparation of 16-methylene-17α-hydroxy progesterones and 16-methylene corticoids.

In a preferred mode of this invention, methyl magnesium bromide in tetrahydrofuran is added to 16-dehydropregnenolone acetate (i.e., 5,16-pregnadien-3β-ol-20-one 3-acetate) in tetrahydrofuran under a blanket of nitrogen at about 0–5° C., the quantity of Grignard reagent being approximately equimolar to that of 16-dehydropregnenolone acetate, whereby is formed the 16α-methyl-20-magnesium bromide enolate, i.e., 3β-acetoxy,16α-methyl-5,17(20)-pregnadien-20-ol 20 magnesium bromide salt. To insure that an excess of Grignard reagent is not used, we find it convenient to follow the course of the reaction by observing the ultraviolet absorption of 237 mµ (conjugated Δ16-20-carbonyl absorption bond) of the reaction mixture. When the absorption at 237 mµ becomes negligible, addition of methyl magnesium bromide is discontinued. Bromine is then added to the thus prepared 16α-methyl-20-magnesium bromide enolate in situ in tetrahydrofuran under nitrogen (the molar qauntity of bromine being substantially equivalent to that of the starting steroid) at a rate sufficient to maintain the reaction temperature at about 0–5° C. To avoid the possibility of adding an excess of bromine, the final portion of bromine is added cautiously and addition discontinued as soon as the reaction mixture reacts positively with starch-iodide paper. The reaction mixture is then poured into a large volume of water and there is formed a precipitate of 16α-methyl-17α-bromopregnenolone acetate (contaminated with small quantities of 16α-methyl-17β-bromo-17-iso-pregnenolone acetate) in excellent yield and of a purity suitable for use without further purification for dehydrohalogenation according to known procedures to produce 16-methyl-16-dehydropregnenolone acetate.

Alternatively, after obtaining a positive starch-iodide test and prior to isolation of the 16α-methyl-17-bromopregnenolone acetate as described above, we sometimes add a slight molar excess of bromine. Debromination at C–5 and 6 of any 5,6,17-tribromo derivative thereby formed is effected by procedures known in the art such as by treatment with an alkali metal iodide in quantities equimolar to the molar excess of bromine used. Dilute aqueous bisulfite is then added to reduce the liberated iodine until the iodine color is discharged from the solution. By this alternative procedure, higher yields of a purer product are more easily obtained.

In our process, a stoichiometric quantity of Grignard reagent (e.g., methyl magnesium bromide) is added to the solution of a 16-dehydro-20-keto-pregnane; therefore, there is never an excess of Grignard reagent present and any protective groups on the 16-dehydro-20-keto-pregnane, such as ester groups, and the like, remain unchanged in the resulting 20-magnesium halide salt of the 16α-alkyl-20-enolate product. There is thus advantageously eliminated the additional step of reforming any hydrolyzed protective groupings prior to bromination which is necessary in prior art procedures for making 16α-alkyl-17-bromo-20-keto-pregnanes via preparation and bromination of a 16-alkyl-20-enolate of a 16-dehydro-20-keto-pregnane.

After the addition of Grignard reagent is complete, there is present in the reaction mixture only 16α-alkyl-20-magnesium halide enolate in an ethereal solvent to which can be added in situ a stoichiometric quantity of bromine, and bromination will occur selectively at C–17 without addition to unsaturations which may exist elsewhere in the molecule such as at C–1, 4, 5,5(10) and 9(11). Thus, our process produces a 16α-alkyl-17-bromo-20-keto-pregnane of high purity in excellent yields.

The above represents a preferred mode of our invention, it being understood that modifications thereof are contemplated as being within the inventive concept. Thus, Grignard reagents other than methyl magnesium bromide may be used to prepare the requisite enol intermediate, those preferred being lower alkyl magnesium chlorides and bromides such as methyl magnesium chloride, ethyl magnesium bromide, propyl magnesium chloride and the like. Lower alkyl iodides are not preferred Grignard reagents since, during the bromination of the magnesium iodide enolate thereby formed, there will result competing reactions due to the oxidation of iodide to molecular iodine by bromine.

In the Grignard step, catalysts known in the art such as cuprous halides are advantageously employed. We have found that improved yields are obtained when cuprous chloride (usually 0.1 mole per mole of steroid used) is added to the solution of steroid in tetrahydrofuran prior to addition of the Grignard reagent.

The process is preferably carried out at temperatures in the range of about 0–5° C., although higher temperatures may be employed in the Grignard addition step, and lower temperatures may be employed during the bromination step.

The transformations are advantageously, although not necessarily, carried out under a blanket of inert gas such as argon or nitrogen.

By this process, it is now possible to prepare 16α-methyl-17α-bromopregnenolone acetate directly from 16-dehydropregnenolone acetate without isolation of the enolate intermediate prior to bromination thereof, and to obtain almost quantitative yields of 16α - methyl - 17α-bromopregnenolone acetate in which is present a very small quantity of the 17β-bromo-17-iso epimer (i.e., 16α-methyl-17β-bromo-17-iso-pregnenolone acetate).

Pure 16α-methyl - 17α - bromopregnenolone acetate is conveniently isolated from the isomeric mixture via crystallization and chromatography.

We have discovered that 16α-methyl-17α-bromopregnenolone acetate dehydrobrominates at a much faster rate than the corresponding 17β-bromo-17-iso derivative when subjected to dehydrobrominating agents known in the art. Thus, a method of obtaining a pure sample of 16α-methyl-17β-bromo - 17 - iso-pregnenolone acetate involves subjecting the isomeric mixture (which is predominantly 16α-methyl-17α-bromopregnenolone acetate) to conventional dehydrobromination techniques such as with lithium bromide and lithium carbonate in dimethylformamide at reflux temperature for about two hours. After acidification of the reaction mixture with mineral acid and filtration of the crude product followed by crystallization from ether-methanol, for example, there is obtained 16-methyl-16-dehydropregnenolone acetate. The filtrate thereof is then concentrated and purified by chromatographic techniques to obtain 16α-methyl-17β-bromo-iso-pregnenolone acetate; M.P. 140–141° C. α$_D$ 0° (dioxane), a novel compound of this invention.

When 16α-methyl-17α-bromopregnenolone acetate is being prepared for utilization as an intermediate in the preparation of 16-methyl-16 - dehydropregnenolone acetate, separation of the 17β-bromo-17-iso-pregnane derivative is not necessary, since both isomers dehydrobrominate, albeit one at a slower rate than the other.

The preferred embodiment of our invention is the preparation of 16α-methyl-17α-bromopregnenolone acetate as discussed hereinabove. Our improved process also is useful in converting the corresponding B-ring saturated analog and the 9(11)-dehydro analogs, e.g., 3β-acetoxy-16-dehydro-5α-pregnan-20-one and 3β-acetoxy-5α-9(11), 16-pregnadiene to the corresponding 16α-alkyl-17-bromo derivatives. Thus, to a tetrahydrofuran solution of 3β-acetoxy-5α-16-pregnen-20-one or 3β-acetoxy - 5α - 9(11),16-pregnadien-20-one at 0–5° C. there is added a stoichiometric quantity of methyl magnesium bromide whereby is formed the corresponding 16α-methyl-5α-17(20)-pregnen-20-ol 20-magnesium bromide salt and 3β-acetoxy-16α-methyl-5α-9(11),17(20)-pregnadien - 20 - ol 20-magnesuim bromide salt, respectively, which, upon treatment in situ with a stoichiometric quantity of bromine will yield the 16α-alkyl-17α-bromo derivatives of the starting 16-dehydro-20-keto pregnanes, i.e., 3β-acetoxy-16α-methyl-17α-bromo-5α-pregnan-20 - one and 3β - acetoxy - 16α-methyl-17α-bromo-5α-9(11)-pregnen-20-one, respectively, in admixture with a small quantity of the corresponding 17β-bromo-17-iso epimers which are separable in the manner described hereinabove. Alternatively, the aforementioned mixtures of isomers, without isolation or further purification thereof, may be dehydrobrominated according to known techniques to obtain 16-methyl-5α-16-pregnen-3β-ol-20- one 3-acetate and 16-methyl-5α-9(11),16-pregnadien-3β-ol-20-one 3-acetate, respectively, which are useful intermediates for the preparation of pharmaceutically valuable 16-methylated compounds.

The former compound, i.e., 16 - methyl - 5α - 16-pregnen - 3β - ol-20-one 3-acetate may be hydrogenated to afford 16β - methyl - 5α - pregnan - 3β - ol-20-one 3-acetate, a valuable intermediate in the process for the preparation of 11,21-oxygenated 16β-methyl-1,4-pregnadienes, which are known anti-inflammatory agents.

The latter compound, i.e., 16α - methyl - 5α - 9(11),16-pregnadien-3β-ol-20-one, may be selectively hydrogenated in the D-ring to give 16β - methyl - 5α - 9(11)-pregnen-3β - ol - 20 - one 3-acetate, an alternative key intermediate in the synthesis of therapeutically valuable 11,21-oxygenated - 16β - methyl - 1,4 - pregnadienes, according to procedures known in the art.

In methods now known in the art whereby are prepared 16α - lower alkyl - 17 - bromo - 20-keto-pregnanes from 16 - dehydro - 20 - keto - pregnanes via bromination of a 16α - alkyl - 20 - enolate thereof, it is always necessary to isolate and, usually, purify or convert the 16α - alkyl-20-metallic enol intermediate to a more stable form prior to addition of bromine.

Our process is an improvement over known procedure in that there is added a stoichiometric amount of Grignard reagent to the 16-dehydro-20-keto-pregnane starting compound (rather than adding the 16-dehydro-20-keto-pregnane to a great excess of Grignard reagent as taught in the art) to obtain a 16α-alkyl-20-magnesium halide enolate intermediate of such purity that isolation or purification of said enolate intermediate is unnecesary, and a stoichiometric quantity of bromine may be added thereto in situ, and there is obtained a pure product of 16α-alkyl-17α-bromo-20-keto-pregnane in excellent yields. Thus, in the preferred mode of our invention, 16-dehydropregnenolone is converted directly to almost a theoretical yield (98.5%) of 16α - methyl - 17α - bromopregneolone acetate (in admixture with a small amount of 16α-methyl-17β-bromo-17-iso-pregnenolone acetate) of good purity (M.P. 170° C.).

For purposes of illustration, the process of this invention is disclosed in detail below. It is to be understood that the examples are merely illustrative of the process and are not to be construed as limiting the invention. Obvious equivalents will be apparent to one skilled in the art, and the invention is to be limited only by the appended claims.

EXAMPLE 1

Preparation of 16α-methyl-17α-bromopregnenolone acetate from 16-dehydropregnenolone acetate (A) Grignard reaction to form 3β-acetoxy-16α-methyl-5,17(20)-pregnadien-20-ol 20-magnesium bromide salt.—
To a solution of 35.65 g. (0.10 mole) of 16-dehydropregnenolone acetate in 356.5 ml. of dry tetrahydrofuran, add 1.1 g. of cuprous chloride (0.011 mole), and cool the mixture to 0–5° C. Vigorously stir this cooled solution under a blanket of nitrogen and add dropwise a 0.5 N solution of methyl magnesium bromide in dry tetrahydrofuran until approximately 0.10 mole of the Grignard reagent is added, as determined by the ultraviolet absorption at 237 mμ (conjugated Δ$^{16}$-20-carbonyl) of samples removed from the reaction mixture. When the absorption at 237 mμ becomes negligible, discontinue addition of the methyl magnesium bromide solution. Add the methyl magnesium bromide solution at such a rate as to maintain the reaction temperature between 0 and 5° C. Normally within 15 to 20 minutes, the addition is complete, and there is formed 3β -acetoxy - 16α - methyl-5, 17(20) - pregnadien - 20 - ol 20-magnesium bromide salt in tetrahydrofuran.

(B) In situ bromination of the 20-magnesium bromide enolate.—Continue to vigorously agitate the reaction mixture of Example 1(A) containing 3β - acetoxy - 16α-methyl - 5,17(20) - pregnadien-20-ol 20-magnesium bromide salt in tetrahydrofuran under a blanket of nitrogen and add over a 10 to 15 minute period about 14 g. of dry bromine at such a rate as to maintain the reaction temperature at 0–5° C. Then continue cautious addition of small quantities of bromine until a total of about 0.10 mole of bromine has been added as determined by obtaining a positive test of the reaction mixture with starch-iodide test paper. Pour the reaction mixture into 10 liters of distilled water, and collect the precipitate thereby formed by filtration, and wash with water and dry to obtain substantially 16α - methyl - 17α - bromopregnenolone acetate in admixture with a small quantity (usually about 5%) of 16α - methyl - 17β - bromo-iso-pregnenolone acetate. Yield=47 g.

This product may be used without further purification for dehydrohalogenation according to known procedures to produce 16-methyl-16-dehydropregnenolone acetate.

Alternatively, in the above procedure after a positive starch-iodide test, add about a 5 molar percent excess of bromine, then add 7.5 g. of anhydrous sodium iodide. Stir the mixture at 40° C. for one and one-half hours, cool the mixture to room temperature, and add a 10% solution of aqueous sodium bisulfite until the liberated iodine is completely reduced, as determined by the loss of iodine color in the solution. Pour the reaction mixture into 10 liters of distilled water, collect the resultant precipitate by filtration, wash with water and dry to give substantially 16α-methyl-17α-bromopergnenolone acetate in admixture with about 5% of 16α-methyl-17β-bromo-iso-pregnenolone acetate.

(C) 16α-methyl - 17α - bromopregnenolone acetate.—
Add the 16α-methyl-17-bromopregnenolone acetate obtained according to the procedure of Example 1(B) (47 g.) to 235 ml. of methylene chloride and stir at room temperature for ten minutes. Add 23.5 g. of magnesium sulfate and filter the mixture through either a clarifying mat or a supercell mat. Wash the filtrate with about 200 ml. of methylene chloride, then concentrate the filtrate to about 165 ml. by atmospheric distillation. Then replace the methylene chloride with acetone by codistillation, to a acetone solution having a volume of about 235 ml. Dilute the acetone solution with one liter of distilled water. Filter the resultant precipitate, wash with water and dry to obtain 16α--methyl-17α-bromopregnenolone acetate in admixture with a small quantity of 16α-methyl-17β-bromo-17-iso-pregnenolone acetate, M.P.=170° C. Yield=44.5 g. (98.5%).

For analytical sample, purify by recrystallization from diethyl ether-methanol to obtain 16α-methyl-17α-bromopregnenolone acetate M.P.=182–184° C. α$_D^{25}$—126° (1% dioxane).

EXAMPLE 2

16-α-methyl-17β-bromo-17-iso-5-pregnen-3β-ol-20-one 3-acetate (A) To a suspension of 7 g. of lithium bromide and 6 g. of lithium carbonate (both vigorously dried) in 150 ml. of anhydrous dimethylformamide, add 6.5 g. of 16α-methyl-17α-bromopregnenolone acetate in admixture with some 16α-methyl-17β-bromo-iso-pregnenolone acetate, prepared as described in Example 1(B). Heat the mixture at reflux temperature for two hours, then cool and pour into a mixture of 10% hydrochloric acid and ice. Separate the resultant precipitate by filtration. Wash the precipitate with water and dry to yield substantially 16-methyl-16-dehydropregnenolone acetate in admixture with some 16α-methyl-17β-bromo-17-iso-pregnenolone acetate. Purify by crystallization from methanol to give 3.48 g. of 16-methyl-16-dehydropregnenolone acetate.

M.P. 171–172° C. $\lambda_{max.}^{MeOH}$ 252 mμ (ε8700)

(B) Concentrate the methanolic filtrate obtained in procedure 2(A) to a residue comprising 16α-methyl-17β-bromo-iso-pregnenolone acetate. Purify by chromatographing on silica gel eluting with 2% ether-hexane. Crystallize the combined-ether-hexane fractions from ether-methanol to give 337 mg. of 16α-methyl-17β-bromo-iso-pregnenolone acetate. M.P. 140–141° C. α$_D$ 0° (dioxane).

EXAMPLE 3

Dehydrobromination of 16α-methyl-17β-bromo-iso-pregnenolone acetate

To a solution of 100 mg. of 16α-methyl-17β-bromo-iso-pregnenolone acetate in 5 ml. of acetamide, add 235 mg. of dry lithium bromide and 190 mg. of dry lithium carbonate. Heat the mixture at reflux temperature for 3.5 hours. Cool and pour into a mixture of 10% hydrochloric acid and ice. Filter the resultant precipitate comprising 16-methyl-16-dehydropregnenolone acetate. Purify by treatment with decolorizing charcoal in methanol and crystallize from methanol to give 16-methyl-16-dehydropregnenolone acetate.

M.P. 172–173° C. $\lambda_{max.}^{MeOH}$ 252 mμ (ε8700)

EXAMPLE 4

Preparation of 16α-methyl-17α-bromo-5α-9(11)-pregnen-3β-ol-20-one 3 acetate from 5α-9(11),16-pregnadien-3β-ol-20-one 3-acetate (A) Grignard reaction to form 3β-acetoxy-16α-methyl- 5α-9(11),17(20)-pregnadien-20-ol-20-magnesium bromide salt.—Treat a sample of 1.75 g. of 5α-9(11),16-pregnadien-3β-ol-20-one 3-acetate with methyl magnesium bromide in the manner similar to that described in Example 1(A) to obtain 3β-acetoxy-16α-methyl-5α-9(11),17(20)-pregnadien-20-ol 20-magnesium bromide salt.

(B) In situ bromination of the 20-magnesium bromide enolate.—In a manner similar to that described in Example (1B), add dry bromide to 3β-acetoxy-16α-methyl-5α-9(11),17(20)-pregnadien-20-ol 20-magnesium bromide salt in tetrahydrofuran under a blanket of nitrogen (prepared in Example 4(A)). Isolate the resultant product in the described manner to give substantially 16α-methyl-17α-bromo-5α-9(11)-pregnen-3β-ol-20-one 3-acetate in admixture with a small quantity of 16α-methyl-17β-bromo-5α-17-iso-9(11)-pregnen-3β-ol-20one 3 acetate.

This product may be used without further purification for dehydrohalogenation according to known procedures to produce 16-methyl-5α-9(11),16-pregnadien-3β-ol-20-one 3-acetate.

(C) 16α-methyl-17α-bromo-5α-9(11)-pregnen-3β-ol-20-one 3-acetate.—Purify 16α-methyl-17α-bromo-5α-9(11)-pregnen-3β-ol-20-one 3-acetate in admixture with a small quantity of 16α-methyl-17β - bromo - 5α - 17 - iso - 9(11)-pregnen-3β-ol-20-one 3-acetate (obtained as described in Example 4(B)) by thick layer chromatography on silica gel developed with 1% methanol in benzene, followed by crystallization of the product thereby isolated from methanol to give 16α - methyl - 17α - bromo-5α-9(11)-pregnen-3β-ol-20-one 3-acetate. M.P. 136–138° C. α_D —82.5° C. (Dioxane).

EXAMPLE 5

16α-methyl-17β-bromo-5α-17-iso-9(11)-pregnen-3β-ol-20-one 3-acetate (A) Treat 800 mg. of 16α-methyl-17α-bromo-5α-9(11)-pregnen-3β-ol-20-one 3-acetate (containing some 16α-methyl - 17β - bromo - 5α - 17 - iso - 9(11) - pregnen - 3β-ol-20-one 3-acetate), prepared as described in Example 4(B), with lithium bromide and lithium carbonate in dimethylformamide for 1.5 hours in the manner similar to that described in Example 2(A). Pour the reaction mixture onto 10% hydrochloric acid and ice and separate the resultant precipitate by filtration. Wash the precipitate with water, dry and crystallize from methanol to obtain 374 mg. of 16-methyl-5α-9(11),16-pregnadien-3β-ol-20-one 3-acetate.

M.P. 142–143° C. $\lambda_{max}^{MeOH}$ 252 mμ (ε8550)

(B) Concentrate the methanolic filtrate obtained in Example 5(A) to a residue. Chromatograph this residue on silica gel eluting with 2% ether-hexane. Crystallize the combined fractions from ether-methanol to give 49 mg. of 16α - methyl - 17β - bromo - 5α - 17 - iso - 9(11) - pregnen-3β-ol-20-one 3-acetate. M.P. 144–145° C. [α]_D+62° (dioxane).

EXAMPLE 6

Preparation of 16α-methyl-17α-bromo-5α-pregnan-3β-ol-20-one 3-acetate from 16-dehydro-5α-pregnan-3β-ol-20-one 3-acetate (A) Grignard reaction to form 3β-acetoxy-16α-methyl-5α-17(20)-pregnen-20-ol 20-magnesium bromide salt.—In a manner similar to that described in Example 1(A), treat 5α-16-pregnen-3β-ol-20-one 3-acetate with an equimolar quantity of methyl magnesium bromide in dry tetrahydrofuran in the presence of cuprous chloride under a blanket of nitrogen to obtain 3β-acetoxy-16α-methyl-5α-17(20)-pregnen-20-ol 20-magnesium bromide salt in tetrahydrofuran.

(B) In situ bromination of 20-magnesium bromide enolate.—In a manner similar to that described in Example 1(B), add dry bromine to 3β-acetoxy-16α-methyl-5α-17(20)-pregnen-20-ol 20-magnesium bromide salt (prepared in above Example 6A) in tetrahydrofuran under a blanket of nitrogen; the molar quantity of bromine used being equal to the molar quantity of 5α-16-pregnen-3β-ol-20-one 3-acetate, the starting compound for Example 6A. Isolate the resultant product in the described manner to obtain substantially 16α-methyl-17α-bromo-5α-pregnan-3β-ol-20-one 3-acetate in admixture with a small quantity of 16α-methyl-17β-bromo-17-iso-5α-pregnan-3β-ol-20-one 3-acetate.

(C) 16α - methyl - 17α - bromo - 5α - pregnan - 3β - ol-20-one 3-acetate.—In a manner similar to that described in Example 1(C), purify the 16α-methyl-17-bromo-5α-pregnan-3β-ol-20-one 3-acetate obtained in above Example 6(B) to obtain 16α-methyl-17α-bromo-5α-pregnan-3β-ol-20-one 3-acetate. Further purify by recrystallization from diethyl ether-methanol.

EXAMPLE 7

16α-methyl-17β-bromo-17-iso-5α-pregnan-3β-ol-20-one 3-acetate

In a manner similar to that described in Example 2(A), treat the 16α-methyl-17α-bromo-5α-pregnan-3β-ol-20-one 3-acetate in admixture with some 16α-methyl-17β-bromo-17-iso-5α-pregnan-3β-ol-20-one 3-acetate (obtained as described in Example 5(B) with lithium bromide and lithium carbonate in anhydrous dimethylformamide. Isolate and purify the resultant products in the manner described to obtain 16-methyl-5α-16-pregnen-3β-ol-20-one 3-acetate and 16α - methyl-17β-bromo-17-iso-5α-pregnan-3β-ol-20-one 3-acetate.

We claim:
1. In the process wherein a 16-dehydro-20-keto-pregnane selected from the group consisting of a compound of the following formula, the 5,6-dehydro- and the 9(11)-dehydro analogs thereof:

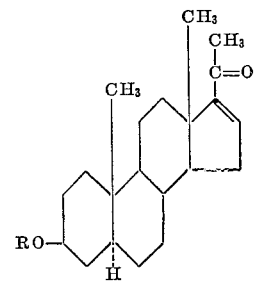

R being a member selected from the group consisting of hydrogen and lower alkanoyl; is treated with a lower alkyl magnesium halide of the following formula: $R_1$—Mg—X; $R_1$ being lower alkyl and X being halogen; and the thereby formed 16α-lower alkyl-20-magnesium halide enolate of said 16-dehydro-20-keto-pregnane is treated with bromine;

the improvement which comprises adding said lower alkyl magnesium halide wherein said halide is selected from the group consisting of bromine and chlorine, to said 16-dehydro-20-keto-pregnane, said lower alkyl magnesium halide being approximately equimolar to said 16-dehydro-20-keto-pregnane;

and adding bromine to the thereby formed 16α-lower alkyl-20-magnesium halide enolate in situ in a ratio of about one mole of bromine per mole of said 16-dehydro-20-keto-pregnane; whereby is formed a 16α-lower alkyl-17-bromo-20-keto-pregnane selected from the group consisting of a compound of the following formula, the 5,6-dehydro- and the 9(11)-dehydro analogs thereof:

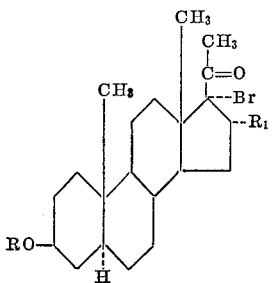

wherein R and R₁ are as hereinabove defined.

2. The process of claim 1 including the step of isolating the 16α-lower alkyl-17-bromo-20-keto-pregnane thereby produced.

3. The process of claim 1 wherein said alkyl magnesium halide is added to said 16-dehydro-20-keto-pregnane in the presence of cuprous chloride.

4. The process of claim 1 wherein said 16-dehydro-20-keto-pregnane is 16-dehydropregnenolone acetate, and wherein said lower alkyl magnesium halide is methyl magnesium bromide.

5. The process of claim 1 wherein said 16-dehydro-20-ketone-pregnane is 16-dehydropregnenolone acetate, and said lower alkyl magnesium halide is methyl magnesium bromide when carried out in tetrahydrofuran and wherein there is present about 0.11 mole of cuprous chloride per mole of 16-dehydro-pregnenolone acetate.

6. The process of claim 5, including the additional step of isolating the 16α-methyl-17α-bromopregnenolone acetate thereby formed.

7. The process for preparing 16α-methyl-17β-bromo-17-iso-pregnenolone acetate which comprises reacting 16-dehydropregnenolone acetate in tetrahydrofuran and in the presence of about 0.11 moles of cuprous chloride per mole of 16-dehydropregnenolone acetate with methyl magnesium bromide, said methyl magnesium bromide being added to said 16-dehydro-pregnenolone acetate in a ratio of approximately one mole methyl magnesium bromide per mole of 16-dehydropregnenolone acetate; and adding bromine to the thereby formed 3β-acetoxy-16α - methyl - 5,17(20) - pregnadien-20-ol 20-magnesium bromide salt in situ in a ratio of approximately one mole of bromine per mole of said 16-dehydropregnenolone acetate, and isolating the 16α-methyl-17β-bromo-17-isopregnenolone acetate formed.

References Cited

UNITED STATES PATENTS

| | | | |
|---|---|---|---|
| 3,013,034 | 12/1961 | Sletzinger et al. | 260—397.45 |
| 3,080,393 | 3/1963 | Stork et al. | 260—397.45 |
| 3,083,215 | 3/1963 | Cutler et al. | 260—397.45 |
| 3,157,680 | 11/1964 | Graber et al. | 260—397.4 |

OTHER REFERENCES

Stacy et al., J. Amer. Chem. Soc. 76, 1914–1916 (1953).
Lutz et al., J. Amer. Chem. Soc. 63, 3180–3189 (1941).

LEWIS GOTTS, *Primary Examiner.*

ETHEL G. LOVE, *Assistant Examiner.*

U.S. Cl. X.R.
260—397.45, 239.55, 397.5

UNITED STATES PATENT OFFICE
CERTIFICATE OF CORRECTION

Patent No. 3,422,123                          January 14, 1969

Hans Reimann et al.

It is certified that error appears in the above identified patent and that said Letters Patent are hereby corrected as shown below:

Column 1, line 15, "16-dihydro-" should read -- 16-dehydro- --. Column 2, lines 22 to 24, "yield 16-methyl-16-dehydropregnenolone and its corresponding acetate are well known compounds in the steroid literature," should read -- yield 16-methyl-16-dehydropregnenolone acetate. 16-Methyl-16-dehydropregnenolone and its corresponding acetate are well known compounds in the steroid literature, --. Column 6, line 25, "$\alpha_D^{25}$" should read -- $[\alpha]_D^{25}$ --; line 53, "$\alpha_D$ 0°" should read -- $[\alpha]_D$ 0° --. Column 7, line 30, "$\alpha_D$" should read -- $[\alpha]_D$ --.

Signed and sealed this 24th day of March 1970.

(SEAL)
Attest:

EDWARD M. FLETCHER, JR.                     WILLIAM E. SCHUYLER, JR.
Attesting Officer                               Commissioner of Patents